United States Patent
Kose et al.

(10) Patent No.: US 9,749,006 B1
(45) Date of Patent: Aug. 29, 2017

(54) ESTIMATION AND MITIGATION OF SWEPT-TONE INTERFERERS IN FREQUENCY-HOPPED SYSTEMS

(71) Applicant: TrellisWare Technologies, Inc., San Diego, CA (US)

(72) Inventors: Cenk Kose, San Diego, CA (US); Keith M. Chugg, La Cañada, CA (US)

(73) Assignee: TrellisWare Technologies, Inc., San Diego, CA (US)

( * ) Notice: Subject to any disclaimer, the term of this patent is extended or adjusted under 35 U.S.C. 154(b) by 0 days.

(21) Appl. No.: 15/374,285

(22) Filed: Dec. 9, 2016

Related U.S. Application Data

(63) Continuation-in-part of application No. 15/053,966, filed on Feb. 25, 2016, now Pat. No. 9,543,994.

(51) Int. Cl.
| | | |
|---|---|---|
| *H04B 1/10* | (2006.01) | |
| *H04B 1/715* | (2011.01) | |
| *H04L 25/03* | (2006.01) | |

(52) U.S. Cl.
CPC ....... *H04B 1/715* (2013.01); *H04L 25/03853* (2013.01); *H04B 2001/7152* (2013.01); *H04B 2201/71353* (2013.01)

(58) Field of Classification Search
CPC ............ H04B 1/715; H04B 2001/7152; H04B 2201/71353; H04L 25/03853
See application file for complete search history.

(56) References Cited

U.S. PATENT DOCUMENTS

| | | | |
|---|---|---|---|
| 5,867,539 A | 2/1999 | Koslov | |
| 6,118,805 A | 9/2000 | Bergstrom et al. | |
| 6,920,191 B2 | 7/2005 | Hafeez et al. | |
| 2010/0158075 A1 | 6/2010 | Deisher et al. | |
| 2012/0294396 A1* | 11/2012 | Desai | H04L 5/0062 375/343 |
| 2017/0019132 A1* | 1/2017 | Baker | H04B 1/0475 |
| 2017/0111069 A1* | 4/2017 | Dafesh | H04B 1/1027 |

OTHER PUBLICATIONS

International Search Report and Written Opinion for Application No. PCT/US 17/19065, mailed May 11, 2017, 9 pages.

* cited by examiner

*Primary Examiner* — Dac Ha
(74) *Attorney, Agent, or Firm* — Kilpatrick Townsend & Stockton, LLP

(57) ABSTRACT

The estimation and mitigation of swept-tone interferers includes receiving a composite signal comprising a signal of interest and a swept-tone interferer over an observation bandwidth or a hop bandwidth in a frequency-hopping system. The estimation of the interfering signal may be based on modeling the interferer as a magnitude periodic signal comprising non-overlapping, contiguous epochs, where each epoch may comprise a common pulse shape and a distinct phase rotation. The modeling may be based over the observation bandwidth, the hop bandwidth, or after combining the signal over all the frequency hop bandwidths. The period of the magnitude-periodic signal may be initially determined, and the common pulse shape and each of the distinct phase rotations may then be estimated. These estimates may be used to reconstruct an estimate of the swept-tone interferer, which may be subtracted from the composite signal to generate an interference-mitigated signal of interest.

20 Claims, 12 Drawing Sheets

ESTIMATION AND MITIGATION OF SWEPT-TONE INTERFERERS IN FREQUENCY-HOPPED SYSTEMS

CROSS-REFERENCES TO RELATED APPLICATIONS

This application is a continuation-in-part of U.S. application Ser. No. 15/053,966, filed Feb. 25, 2016, which is hereby expressly incorporated by reference in its entirety for all purposes.

FIELD OF THE INVENTION

The present invention relates to wireless communication systems, including those that are frequency-hopped, that are subject to interference, and in particular, the estimation and mitigation of swept-tone interferers that are routinely employed as jamming signals.

BACKGROUND

Swept-tone interferers are usually characterized by linear frequency modulations: the instantaneous frequency of the signal sweeps a range of several megahertz (MHz) in a few microseconds, thereby affecting the entire band targeted by the interfering signal. A narrowband system or one or more hops of a frequency-hopped system, which is subjected to this broadband swept-tone interferer, may experience degraded system performance. Furthermore, the fast variations of the instantaneous frequency of swept-tone jammers make the design of estimation and mitigation techniques particularly challenging.

In an effort to mitigate swept-tone interferers, previous approaches developed include adaptive notch filters that can track the instantaneous frequency of the swept tone (see, for example, "Tracking and Mitigating a Jamming Sign al with an Adaptive Notch Filter," Daniele Borio et al., Inside GNSS, March/April 2014), joint estimation of the parameters of a chirp signal using a least-squares approach (see, for example, "Parameter Estimation of Chirp Signals," Petar M. Djurić and Steven M. Kay, IEEE Transactions on Acoustics, Speech, and Signal Processing, Vol. 38, No. 12, pp. 2118-2126, December 1990), and tone prediction using an adaptive filter structure to enable cancellation of periodic interference signals (see, for example, the disclosure in U.S. Pat. No. 6,434,233 B1).

SUMMARY

In comparison to these previously developed approaches, some of which directly estimate the parameters of the interfering signal, some embodiments of the present invention estimate the period of the swept-tone interferer and models it, in the observation bandwidth, as a magnitude-periodic signal with a common pulse shape. Each periodic segment of the interfering signal may be different from any other segment in phase. In other embodiments of the present invention, the magnitude-periodic model is over the hop bandwidth of a frequency-hopped system. In yet other embodiments of the present invention, the model is over all the hops of a frequency-hopped system that are affected by the swept-tone interferer. The interference estimate may be subtracted from the received filtered composite signal to generate an interference-mitigated signal of interest.

Embodiments of the present invention are directed towards methods and systems for the estimation and mitigation of swept-tone interferers. For example, in one embodiment, a method for estimating a swept-tone interferer comprises: receiving a composite signal over an observation bandwidth, wherein the composite signal comprises a signal of interest and the swept-tone interferer; modeling the swept-tone interferer over the observation bandwidth as a magnitude-periodic signal, wherein the magnitude-periodic signal comprises a plurality of phase-rotated pulses, and wherein each of the plurality of phase-rotated pulses comprises a common pulse shape and a distinct phase rotation; generating an energy signal based on the composite signal; estimating a period of the magnitude-periodic signal based on the energy signal; generating an initial estimate of the common pulse shape based on the period and energy detection of the composite signal, wherein a length of the initial estimate of the common pulse shape is equal to the period; generating a plurality of phase estimates based on a plurality of epochs and the initial estimate of the common pulse shape, wherein the plurality of epochs corresponds to non-overlapping, contiguous segments of the composite signal, wherein a length of each of the plurality of epochs is equal to the period, wherein each of the plurality of epochs comprises the common pulse shape, and wherein each of the plurality of phase estimates is generated for each of the plurality of epochs; generating a plurality of phase de-rotated pulse estimates, wherein each of the plurality of phase de-rotated pulse estimates is based on each of the plurality of epochs and each of the plurality of phase estimates; computing a weighted average of the plurality of phase de-rotated pulse estimates to generate a final estimate of the common pulse shape; and generating an estimate of the swept-tone interferer based on the final estimate of the common pulse shape and the plurality of phase estimates. In some embodiments, the method for mitigating the swept-tone interferer further comprises: subtracting the estimate of the swept-tone interferer from the composite signal to generate an interference-mitigated signal of interest.

Other embodiments of the present invention are directed towards methods and systems for the estimation of swept-tone interferers in frequency-hopped systems. For example, in one embodiment, the frequency-hopping system comprises a plurality of hops, each of the plurality of hops comprising each of a plurality of hop bandwidths, a method for estimating a swept-tone interferer in a frequency-hopping system comprises: sampling a composite signal over each of the plurality of hop bandwidths to generate an initial set of samples for each of the plurality of hops, wherein the composite signal comprises a signal of interest and the swept-tone interferer, and wherein each of the initial set of samples comprises a first set of samples and a second set of samples; determining a number of the first set of samples for each of the plurality of hops; truncating the first set of samples from the initial set of samples for each of the plurality of hops; concatenating the truncated set of samples for each of the plurality of hops to generate a reconstructed composite signal; modeling the swept-tone interferer in the reconstructed composite signal as a magnitude-periodic signal, wherein the magnitude-periodic signal comprises a plurality of phase-rotated pulses, and wherein each of the plurality of phase-rotated pulses comprises a common pulse shape and a distinct phase rotation; estimating a period of the magnitude-period signal; generating an initial estimate of the common pulse shape based on at least the period, wherein a length of the initial estimate of the common pulse shape is equal to the period; generating a plurality of phase estimates based on a plurality of epochs and the initial estimate of the common pulse shape, wherein the plurality of epochs corresponds to non-overlapping, contiguous segments of the reconstructed composite signal, wherein a length of each of the plurality of epochs is equal to the period, wherein each of the plurality of epochs comprises the common pulse shape, and wherein each of the plurality of phase estimates is generated for each of the plurality of epochs; generating a plurality of phase de-rotated pulse estimates, wherein each of the plurality of phase de-rotated pulse estimates is based on each of the plurality of epochs and each of the plurality of phase estimates; computing a weighted average of the plurality of phase de-rotated pulse estimates to generate a final estimate of the common pulse shape; and generating an estimate of the swept-tone interferer based on the final estimate of the common pulse shape and the plurality of phase estimates.

These illustrative embodiments are mentioned not to limit or define the limits of the present subject matter, but to provide examples to aid in the understanding thereof. Illustrative embodiments are discussed in the Detailed Description, and further examples are provided there. Advantages offered by various embodiments may be further understood by examining this specification and/or by practicing one or more embodiments of the claimed subject matter.

Figure 1A:
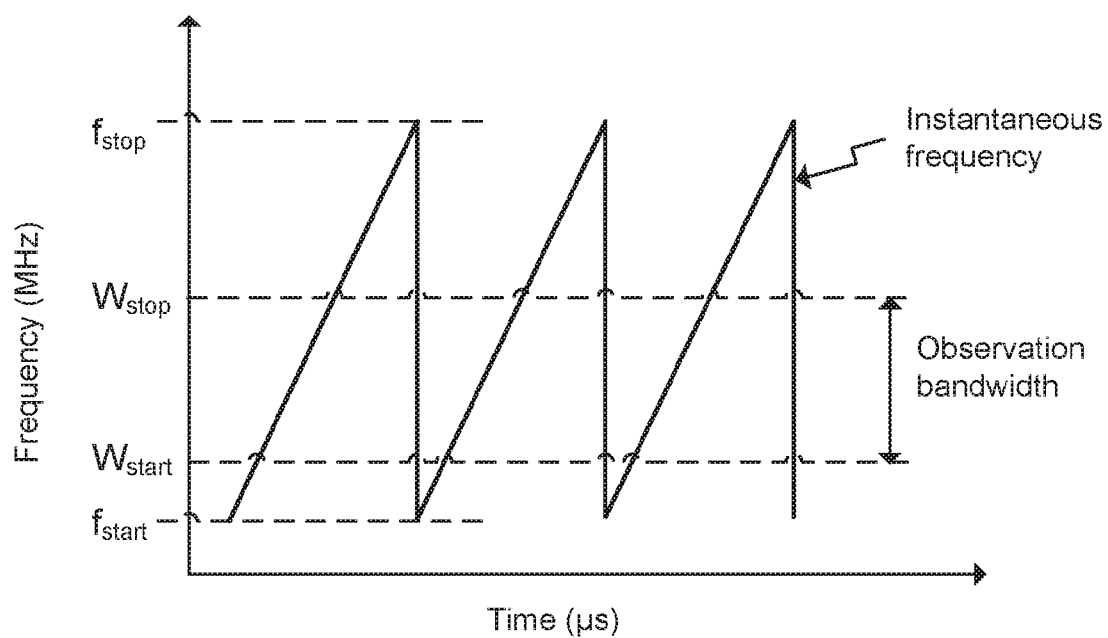
FIGS. 1A and 1B are plots of the instantaneous frequency of swept-tone interferers that can be estimated and mitigated by embodiments of the present invention.

Like labels are used to refer to the same or similar features in the drawings.

DETAILED DESCRIPTION

Figure 1B:
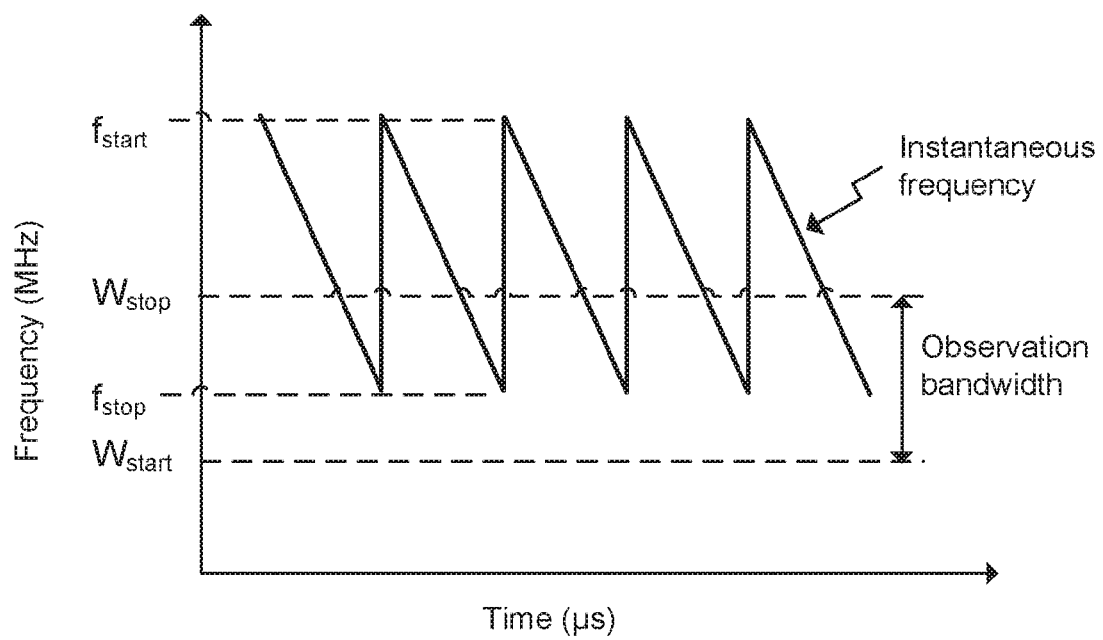

The present invention is well-suited for the estimation and mitigation of swept-tone interferers, i.e. jamming signals that are frequency-modulated with a fast varying center frequency. The time-frequency evolution, or instantaneous frequency as function of time, for representative swept-tone interferers are shown in FIGS. 1A and 1B, wherein the interfering signal sweeps from a frequency $f_{start}$ to a frequency $f_{stop}$ over a few microseconds, and the system that is being affected by this interfering signal operates over an observation bandwidth, denoted $[W_{start}, W_{stop}]$. More generally, the swept-tone interferer may be modeled as $$J(t) = A \cdot \cos(2\pi \xi(t) t + \theta), \quad \text{Eq (1)}$$

where $\xi(t)$ is the instantaneous frequency as a function of time, $t \in (0, T)$, $\theta$ is a random initial phase, and $1/T$ is the repetition frequency of the sweep. In an embodiment, the instantaneous frequency is a linear function, which may be specified as:

$$\xi(t) = \frac{f_{stop} - f_{start}}{T} t + f_{start}. \quad \text{Eq (2)}$$

In another embodiment, the instantaneous frequency may be any function of time that adheres to the edge conditions defined below for each epoch, $k \in [0, K]$, in the received signal:

$$\xi(0) = f_{start}; \ \xi(kT^-) = f_{stop}; \text{ and } \xi(kT^+) = f_{start}. \quad \text{Eq (3)}$$

In the example in FIG. 1A, the observation bandwidth lies entirely within the sweep-range of the interferer, whereas FIG. 1B illustrates the sweep-range of the interferer originating within the observation bandwidth and ending outside the observation bandwidth. In general, embodiments of the present invention are able to successfully estimate and mitigate a swept-tone interferer as long as its sweep-range crosses either edge of the observation bandwidth, which may be represented by the conditions $f_{start} < W_{start} < f_{stop}$ and $f_{start} < W_{stop} < f_{stop}$. That is, the observation bandwidth may lie entirely within the sweep-range, or the sweep-range may start or stop within the observation bandwidth.

Figure 2A:
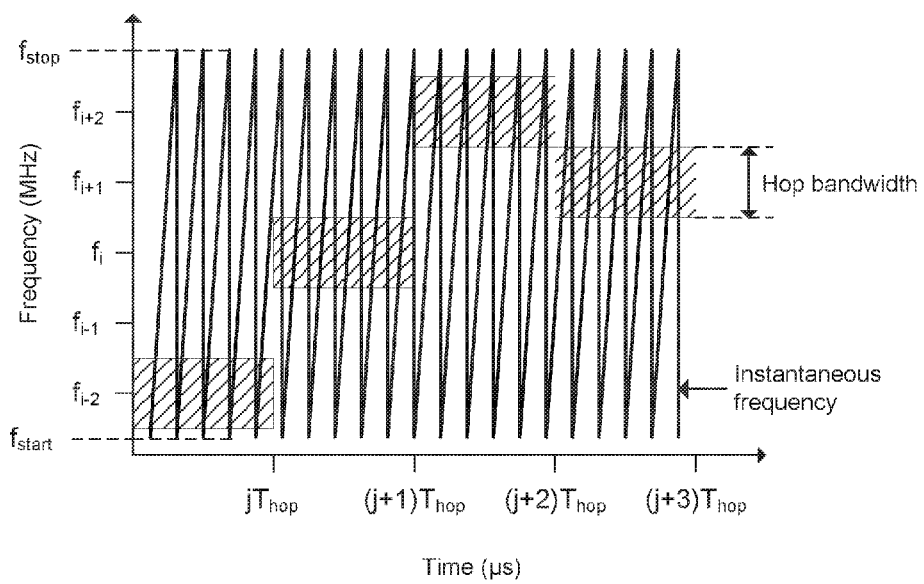
FIGS. 2A and 2B are plots of the instantaneous frequency of swept-tone interferers in a frequency-hopping wireless communication system that can be estimated by embodiments of the present invention.
Figure 2B:
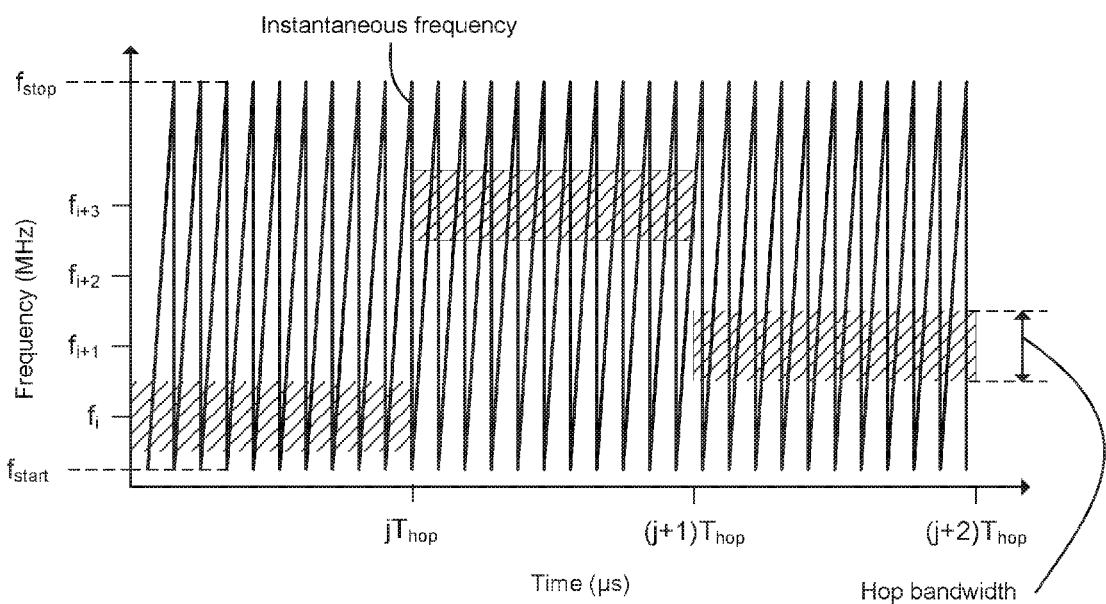

Embodiments of the present invention are also well-suited for the estimation and mitigation of swept-tone interferers in representative frequency-hopped systems, shown in FIGS. 2A and 2B. As seen in FIGS. 2A and 2B, the swept-tone interferer sweeps from a start frequency ($f_{start}$) to a stop frequency ($f_{stop}$), and interferes with each of the hops of the frequency-hopping wireless communications system. As shown in the FIG. 2A, the center-frequency hopping sequence that is employed is $\{f_{i-2}, f_i, f_{i+1}, f_{i+2}\}$, and the swept-tone interferer disrupts communications in each of the frequency hops in the order of the frequency-hopping sequence. The swept-tone interferer shown in FIG. 2A has a repetition rate that results in the interferer crossing each of the frequency hops a certain number of times. In contrast, the swept-tone interferer shown in FIG. 2B has a higher repetition rate, which results in the interferer crossing each of the frequency hops an even greater number of times compared to the case shown in FIG. 2A. In other embodiments, the swept-tone may not interfere with every hop, but embodiments of the present invention described herein may be implemented in those frequency hops that have been affected by the interferer.

Figure 3:
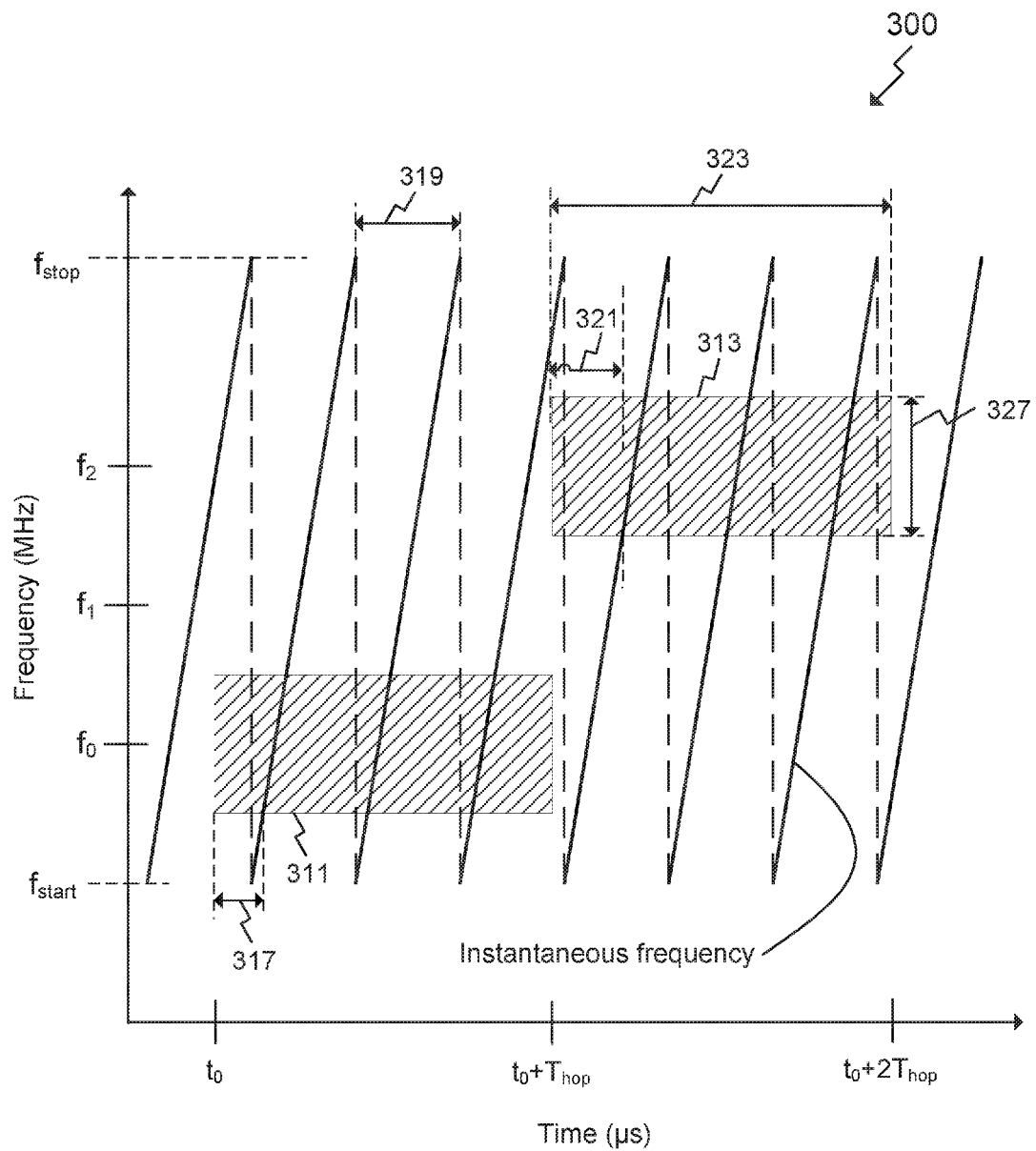
FIG. 3 is a more detailed view of the time-series of the instantaneous frequency of swept-tone interferers in a frequency-hopping wireless communication system.

FIG. 3 plots a "zoomed-in" time-series of the instantaneous frequency of swept-tone interferers in a frequency-hopping wireless communication system, wherein the first hop 311 is at center frequency $f_0$ and the second hop 313 is at center frequency $f_2$. The frequency separation between time-adjacent hops is denoted $\Delta f=|f_2-f_0|$, and in an embodiment, each of the hops has the same hop bandwidth 327 (denoted $BW_{hop}$). In some embodiments of the present invention, the swept-tone interferer is defined by the sweep-rate and the period 319 (denoted T), and the repetition rate of the swept-tone interferer is defined as the inverse of the period.

As noted earlier, the representative linear swept-tone interferers shown in FIGS. 1, 2A-2B, and 3 continually sweep from a start frequency ($f_{start}$) to a stop frequency ($f_{stop}$), and it is start, assumed that the transition from $f_{stop}$ to $f_{start}$ can be instantaneous in time. In other embodiments, the transition from $f_{stop}$ to $f_{start}$ may be a linear sweep as well, in which case the interferer is denoted as exhibiting a "linear triangular sweep."

The swept-tone interferer enters the frequency band of the first hop 311 at a first delay 317 (denoted $\tau_1$) relative to the start of the hop at time $t_0$. The interferer continues to sweep through the hop for the duration of the hop 323 (denoted $T_{hop}$), and enters the second hop 313 at a second delay 321 (denoted $\tau_2$) relative to the start of the hop at time $(t_0+T_{hop})$. As is evident from FIG. 3, the length of the first and second delays, as well as the number of times the linear swept-tone interferer sweeps through a particular hop, is a function of the start frequency ($f_{start}$), the stop frequency ($f_{stop}$), the sweep-rate (denoted $\alpha$) and the period (T) of the swept-tone interferer. Determining the delay for a particular frequency hop enables the identification of those samples in that frequency hop that have been affected by the swept-tone interferer. Thus, the determination of the delays for each frequency hop affected by the interferer can be used to generate an estimate of the interferer.

In an embodiment, if a delay for a current frequency hop ($\tau_i$) is known, the delay for the next frequency hop($\tau_{i+1}$), in the case of a linear swept-tone interferer, can be determined using:

$$\tau_{i+1} = \left(\tau_i + T_{hop} + \frac{\Delta f}{\alpha}\right)\%T. \quad \text{Eq (4)}$$

The relative delay due to the frequency separation $\Delta f$ and the sweep rate $\alpha$ may be denoted $\Delta\tau$. The relationship $\Delta\tau=\Delta f/\alpha$ shown in Equation (4) is valid for swept-tone interferers with linear sweeps. However, for the more general swept-tone defined in Equation (1), the sweep rate will also be a function of time ($\alpha(t)$), and the necessary parameters can be determined by the following relationship:

$$\int_0^{\Delta\tau} \alpha(t)dt = \Delta f. \quad \text{Eq (5)}$$

In another embodiment, if the delay for a first frequency hop ($\tau_i$) is known, the delay for any other frequency hop ($\tau_j$) can be estimated by cross-correlating the samples of the first frequency hop and the samples of the other frequency hop. The samples for each frequency hop include a first set of samples that correspond to a period of time prior to the interferer entering that frequency hop, and a second set of samples that correspond to the frequency hop being affected by the swept-tone interferer. Thus, cross-correlating the samples from the two frequency hops will have a first correlation peak at a lag value that equals $(\tau_i-\tau_j)$.

In yet another embodiment, if the delay for a first frequency hop ($\tau_i$) is known, the delay for other frequency hops can be estimated by cross-correlating the samples of the first frequency hop and the samples for multiple other frequency hops. For example, the samples for the first frequency hop may be correlated with the samples for the second and third frequency hops, and subsequently with the samples for both the third and fourth frequency hops. The first peaks of the correlation outputs may provide coarse delay values. This may be followed by a fine search around the coarse delay values to maximize a sum correlation score. Other embodiments may rely on the cross-correlations between sets of samples from different combinations of multiple frequency hops to provide the coarse delay values.

Figure 4A:
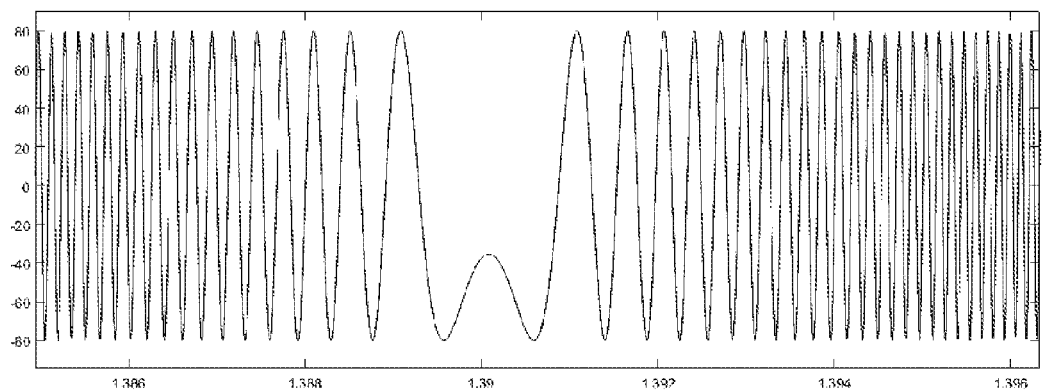
FIGS. 4A, 4B and 4C are time-series plots of a swept-tone interferer at different stages in an embodiment of the present invention.
Figure 4B:
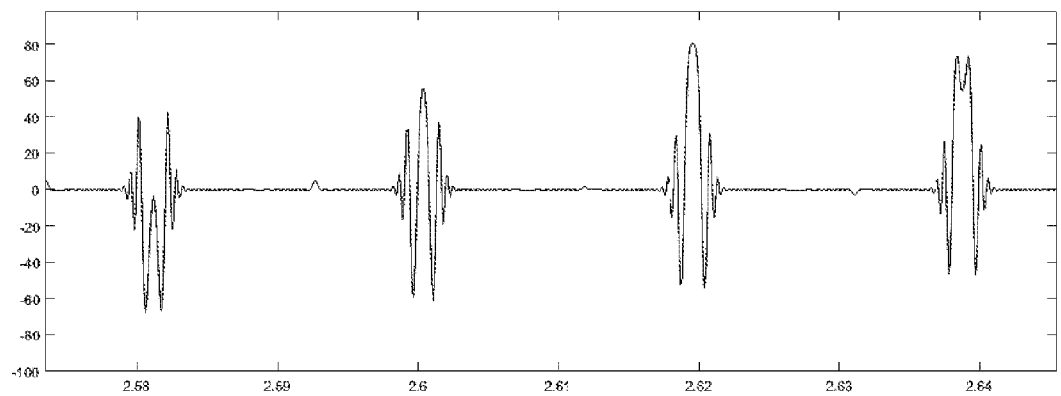
Figure 4C:
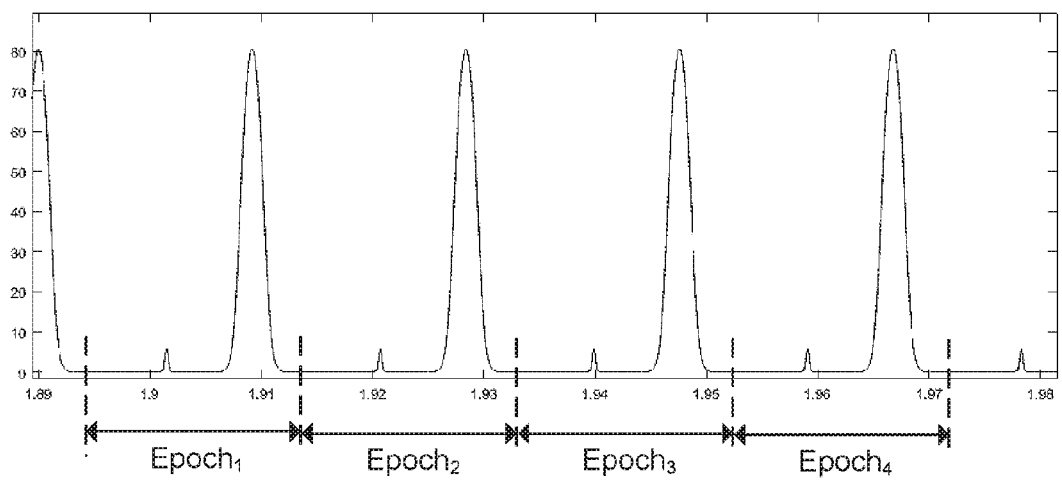

The waveforms shown in FIGS. 4A-4C are generated upon sampling the composite signal (comprising the signal of interest and the swept-tone interferer) over the observation bandwidth. In an embodiment, the power of the swept-tone interferer is significantly greater than that of the signal of interest. Specifically, FIG. 4A shows the real component of the complex-valued swept-tone interferer over the observation bandwidth. As expected, the instantaneous frequency decreases (approaching its lowest frequency at ~1.39) and then increases as a function of time, which is characteristic of a swept-tone interferer. FIG. 4B shows the real component of the swept-tone interferer after a low-pass filtering operation. In an embodiment, the low-pass filter has a bandwidth that is equal to or less than the observation bandwidth. The magnitude-square of the complex-valued filtered composite signal is shown in FIG. 4C. The waveform shown in FIG. 4C is a periodic signal, termed a "magnitude-periodic signal," and serves as the basis of the model used for the estimation and mitigation of swept-tone interferers, as described in embodiments of the present invention. A period of the magnitude-periodic signal, as shown in FIG. 4C, is called an epoch. Thus, the magnitude-periodic signal may be construed as comprising multiple non-overlapping, contiguous epochs.

Figure 5:
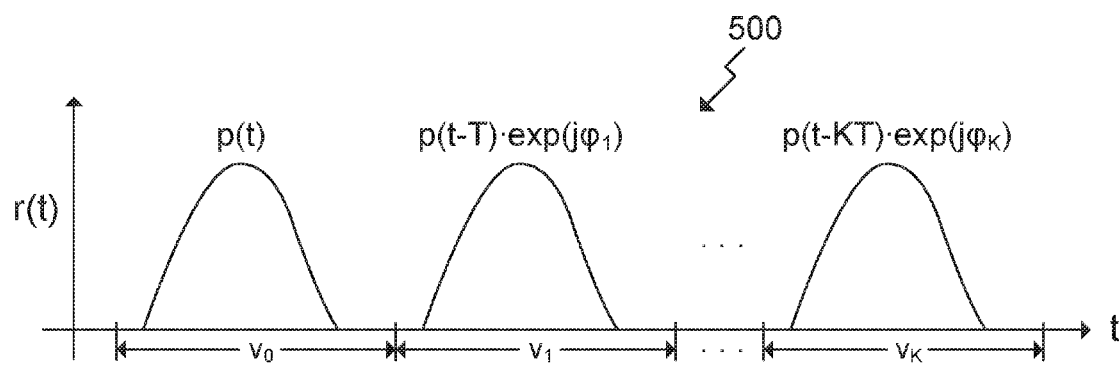
FIG. 5 is an embodiment of a magnitude-periodic signal that enables estimation and mitigation of a swept-tone interferer, according to some embodiments of the present invention.

FIG. 5 depicts another model of a magnitude-periodic signal that is used to enable the estimation of the swept-tone interferer. Herein, the epochs of the magnitude-periodic signal are denoted $v_0, v_1, \ldots, v_K$. In an embodiment, each epoch comprises a common pulse shape p(t) with a distinct phase rotation $\phi_i$, and can be expressed as $$v_k(t)=p(t)\exp(j\phi_k). \quad \text{Eq (6)}$$

Consequently, the magnitude-periodic signal may be represented as $$r(t) = \sum_{k=0}^{K} v_k(t-kT) = \sum_{k=0}^{K} p(t-kT)\exp(j\varphi_k) \quad \text{Eq (7)}$$

where T is the period of the magnitude-periodic signal and therefore also the length of each epoch. This signal representation is used to model the swept-tone interferer in the observation bandwidth. In another embodiment, each epoch may further comprise a distinct amplitude, i.e.

$$v_k(t)=A_k p(t)\exp(j\phi_k). \quad \text{Eq (8)}$$

Figure 6:
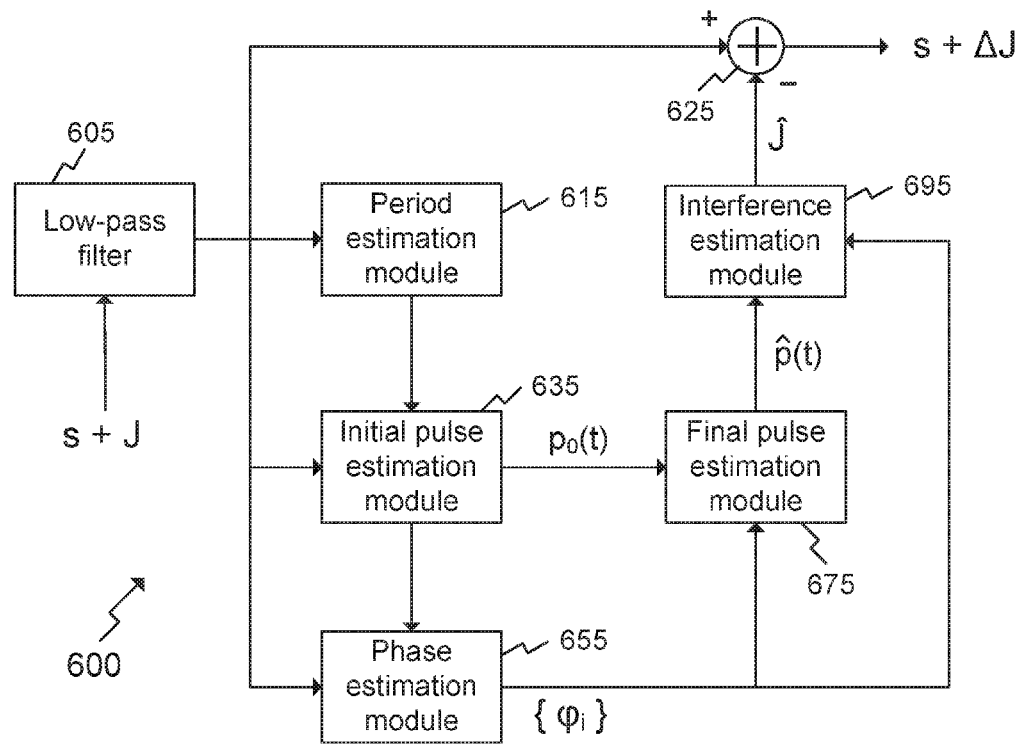
FIG. 6 is a block diagram of an embodiment for estimation and mitigation of a swept-tone interferer, according to an embodiment of the present invention.

FIG. 6 is a block diagram 600 of an embodiment for estimation and mitigation of a swept-tone interferer, according to the present invention. This system includes some features and/or components that are similar to those shown in FIGS. 4 and 5, and described above. At least some of these features and/or components may not be separately described in this section.

In an embodiment, a composite signal comprising a signal of interest s and a swept-tone interferer J is received and filtered using a low-pass filter 605. As described in FIG. 5, the low-pass filtered swept-tone interferer comprises non-overlapping, contiguous epochs, wherein each epoch comprises a common pulse shape p(t) and a distinct phase rotation $\phi_k$. The filtered composite signal is used by a period estimation module 615 to determine the period T of the swept-tone interferer, which is also the length of the epoch. The period T and the filtered composite signal are then utilized by an initial pulse estimation module 635 to generate an initial estimate $p_0(t)$ of the common pulse shape p(t).

A phase estimation module 655 uses the initial pulse estimate $p_0(t)$ in conjunction with the filtered composite signal to generate estimates for the set of distinct phase rotations $\{\phi_k\}_{k=1}^K$ for each of the epochs. The final pulse estimation module 675 generates a final estimate of the common pulse shape $\hat{p}(t)$ based on the initial pulse estimate and the set of distinct phase rotations. This final pulse estimate of the common pulse shape, and the set of distinct phase rotations, is used by an interference estimate module 695 to generate an estimate of the swept-tone interferer. Summer 625 is used to subtract the estimate of the swept-tone interferer from the filtered composite signal to generate an interference-mitigated signal of interest.

Figure 7:
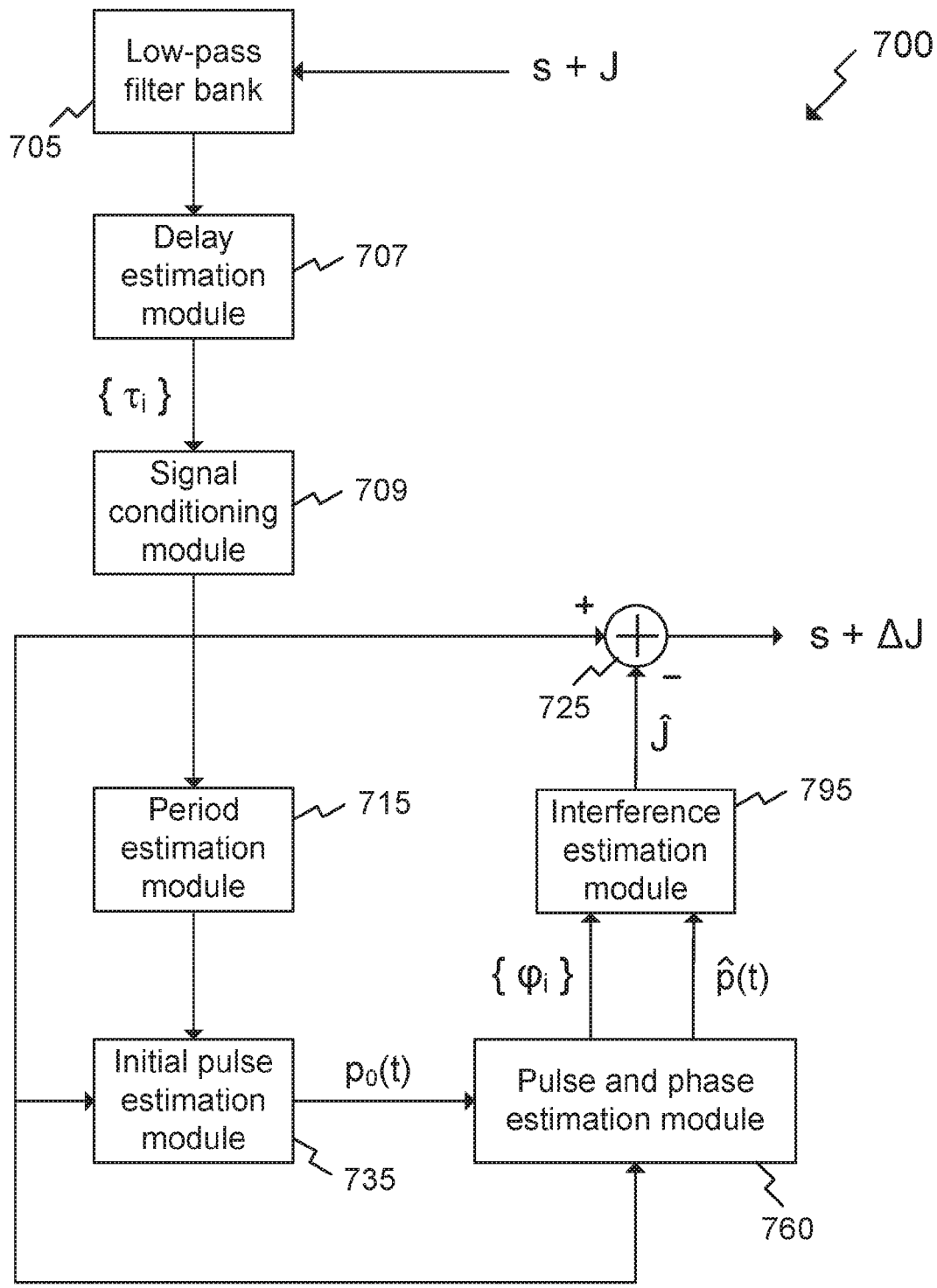
FIG. 7 is a block diagram for a method for estimation of a swept-tone interferer in a frequency-hopping wireless communication system, according to an embodiment of the present invention.

FIG. 7 is a block diagram of an embodiment for estimation of a swept-tone interferer in a frequency-hopping wireless communication system, according to the present invention. This system includes some features and/or components that are similar to those shown in FIGS. 4-6, and described above. At least some of these features and/or components may not be separately described in this section.

The embodiment shown in FIG. 7 is configured to operate in a frequency-hopped system, and receives a composite signal that comprises the signal of interest and a swept-tone interferer over each of the frequency hops. A bank of low-pass filters 705 is initially employed to filter over each of the hop bandwidths. That is, for each of the frequency hops, the observation bandwidth corresponds to the hop bandwidth for that frequency hop. In an embodiment, the hop bandwidths for all the frequency hops are equal. In other embodiments, the hop bandwidths may be distinct for one or more frequency hops.

The filtered composite signals for each of the frequency hops are processed by a delay estimation module 707 that determines the delay for each set of samples. As discussed in the context of FIG. 3, the delays for each of the frequency hops may be determined using Equation (4) if the swept-tone parameters (for an interferer with a linear sweep) are known. That is, if the repetition rate, start and stop frequencies and sweep rate of the swept-tone interferer are known, the delays $\{\tau_0, \tau_1, \ldots\}$ may be computed as described earlier.

In another embodiment, when the parameters of the swept-tone interferer are unknown, the set of samples corresponding to the first frequency hop of the packet/transmission may be used to compute an energy signal, and energy detection of that energy signal may be employed to determine the delay ($\tau_0$) for the first frequency hop. Delays for other frequency hops can be determined by cross-correlating the samples corresponding to the first frequency hop and the samples corresponding to another frequency hop, as described in the context of FIG. 3

The delays for each of the frequency hops are used by the signal conditioning module 709 to reconstruct the composite signal from sets of samples from each of the frequency hops. That is, the delay of a frequency hop corresponds to the number of the first set of samples prior to the interferer entering that particular frequency hop. The signal conditioning module 709 truncates the first set of samples from each set of samples for each frequency hop, and then concatenates the remaining (or second) set of samples from each frequency hop to generate a reconstructed composite signal. The second set of samples contains signal of interest samples that are subject to interference, and concatenating them reconstructs the composite signal.

In an embodiment, the signal conditioning module 709 may be used in the context of FIG. 2A, where there is a relatively lower number of passes of the interferer through each of the frequency hops. That is, if the ratio of the length of the frequency hop ($T_{hop}$) to the period of the swept-tone interferer (T) is small, then the energy from each of the frequency hops must be combined to generate a reliable estimate of the swept-tone interferer. Thus, the first samples from each frequency hop, which correspond to samples that are not affected by the interferer, must be truncated prior to combining the samples from all the frequency hops.

In the reconstructed composite signal, the swept-tone interferer may be modeled as a magnitude-periodic signal, as discussed previously. In an embodiment, the pulse and phase estimation module 760 may be an amalgamation of the phase estimation module 655 with the final pulse estimation module 675, shown in FIG. 6. In another embodiment, an alternative structure or method may be used to generate the plurality of phase estimates and the final estimate of the common pulse shape.

Figure 8A:
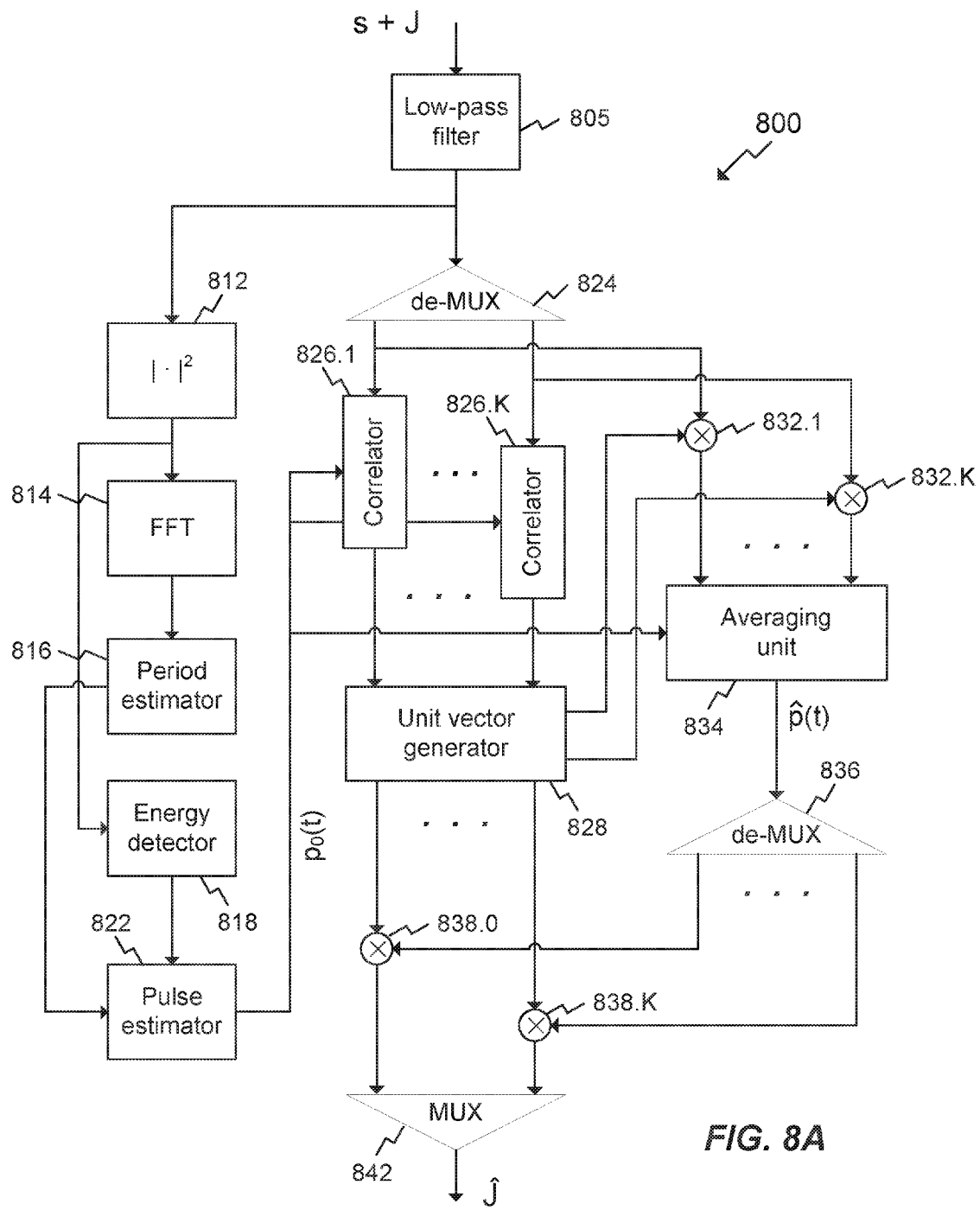
FIGS. 8A and 8B are block diagrams of another embodiment for estimation and mitigation of a swept-tone interferer, according to the present invention.

FIG. 8A is a block diagram 800 of an embodiment for estimation and mitigation of a swept-tone interferer, according to the present invention. This system includes some features and/or components that are similar to those shown in FIGS. 4, 5 and 6, and described above. At least some of these features and/or components may not be separately described in this section.

In an embodiment, the magnitude-square of the filtered composite signal (also referred to as an energy signal) is computed using a squaring module 812, and serves as an input to a fast Fourier transform (FFT) block 814 and an energy detector 818. The FFT block 814 computes a frequency spectrum of the energy signal, and the period estimator 816 uses at least one harmonic of the frequency spectrum to estimate the period T of the energy signal.

The initial estimate of the common pulse shape $p_0(t)$ is generated using a pulse generator 822, and is based on the period T and the output of the energy detector 818. In an embodiment, and in reference to FIG. 5, the initial estimate of the common pulse shape is the epoch $v_0$, i.e. $p_0(t) = v_0$. That is, the phase $\phi_0$ for the first epoch is assumed to be zero.

Demultiplexer 824 is used to partition the non-overlapping, contiguous epochs of the filtered composite signal into individual segments, denoted $v_1, v_2, \ldots, v_K$. Each of these epochs is correlated with the initial pulse estimate using a bank of K correlators 826.1, . . . , 826.K to generate estimates for the distinct phase rotations $\{\phi_k\}_{k=1}^K$ for each of these epochs, i.e.

$$\hat{\phi}_k = \text{angle}(\langle v_0, v_k \rangle), k=1, \ldots, K, \qquad \text{Eq (9)}$$

where $\langle v_0, v_k \rangle = \int_0^T v_0^*(t)v_k(t)dt$ is the inner product of the sampled epochs $v_0(t)$ and $v_k(t)$.

The estimated phases are used by a unit vector generator 828 to generate phase vectors with unit magnitudes and phases that are based on the estimated distinct phase rotations. In an embodiment, a first bank of K multipliers 832.1, ..., 832.K is used to multiply each of the partitioned epochs by unit vectors with phases that are equal to the negative of the estimated distinct phase rotations. That is, each of the epochs $v_1, v_2, \ldots, v_K$ with its distinct phase rotations is de-rotated using the estimates of $\{\hat{\phi}_k\}_{k=1}^K$. An averaging unit 834 generates a final estimate of the common pulse shape $\hat{p}(t)$ by averaging the de-rotated epochs, i.e.

$$\hat{p}(t) = \frac{1}{K+1} \sum_{k=0}^{K} v_k(t) \exp(-j\hat{\phi}_k), \quad \text{Eq (10)}$$

where $\hat{\phi}_0 = 0$, and $\hat{\phi}_k$ is as specified in Equation (9).

In another embodiment, each of the epochs comprises a distinct amplitude (as described in Equation (8)); the amplitude for the $k^{th}$ epoch may be estimated as $$\hat{A}_k = \frac{|\langle v_0, v_k \rangle|}{\|v_0\|^2}, \quad \text{Eq (11)}$$

and the corresponding final estimate of the common pulse shape is computed as $$\hat{p}(t) = \frac{\Sigma \hat{A}_k v_k(t) \exp(-j\hat{\phi}_k)}{\Sigma \hat{A}_k^2} \quad \text{Eq (12)}$$

Note that the weighted average in Equation (12) simplifies to the final estimate of the common pulse shape in Equation (10) when all the amplitudes are equal to each other.

Demultiplexer 836 generates K+1 copies of the final estimate of the common pulse shape, each of which is multiplied by a unit vector with a phase equal to the respective estimated distinct phase rotation using a second bank of K+1 multipliers 838.0, ..., 838.K. The distinctly rotated final pulse estimates are concatenated using a multiplexer 842 to generate an estimate of the swept-tone interferer, given by $$\hat{J}(t) = \sum_{k=0}^{K} \hat{p}(t - kT) \exp(j\hat{\phi}_k). \quad \text{Eq (13)}$$

In an embodiment, this estimate may be subtracted from the filtered complex-valued composite signal to generate an interference-mitigated signal of interest.

Figure 8B:
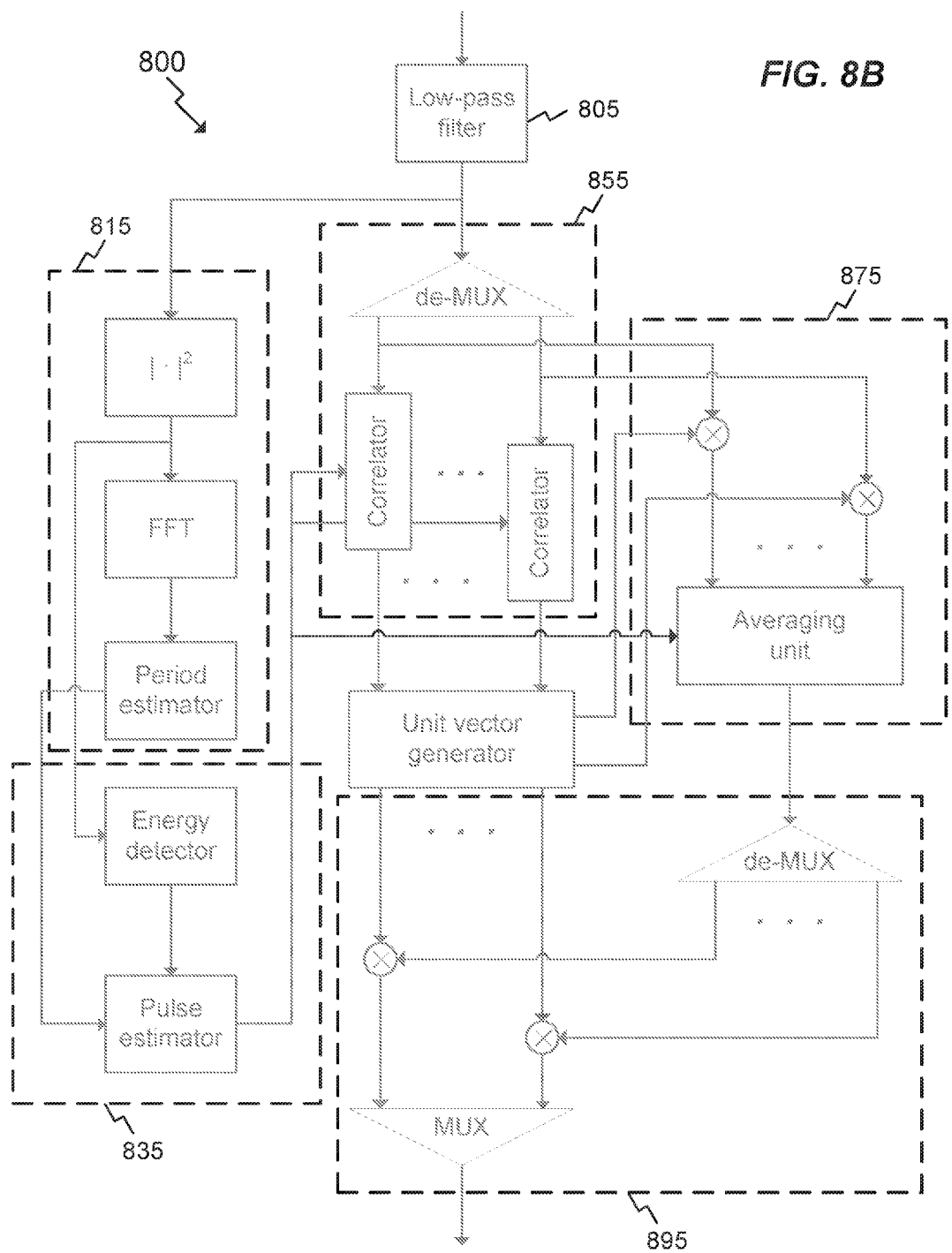

FIG. 8B is a block diagram 800 that maps the embodiment for estimation of a swept-tone interferer described in FIG. 8A to the generic modules shown in FIG. 6. This system includes some features and/or components that are similar to those shown in FIGS. 4, 5, 6 and 8A, and described above. At least some of these features and/or components may not be separately described in this section.

As shown in FIG. 8B, and in reference to FIGS. 6 and 8A, the period estimation module 815 is realized by using at least one harmonic of a frequency spectrum to determine the period, and the frequency spectrum is generated by computing the FFT of an energy signal that is based on the filtered composite signal. In another embodiment, computing the autocorrelation of the magnitude-periodic signal may be used to determine the period. In particular, the autocorrelation will exhibit peaks at all lags that comprise the alignment of the common pulse shapes. That is, a maximum peak of the autocorrelation will occur at zero-lag and additional peaks will occur at lags that correspond to the period of the magnitude-periodic signal. Thus, both time- and frequency-domain methods may be employed to determine the period in the period estimation module 815.

The initial pulse estimation module 835 is realized using an energy detector and a pulse generator that generates an initial estimate of the common pulse shape by extracting the first epoch of the swept-tone interferer. In particular, the energy detector processes the energy signal to determine the start and end points of the common pulse shape in the first epoch, and the period is then used to extract the first epoch. In another embodiment, the autocorrelation of the magnitude-periodic signal may be used to determine the initial pulse estimate. For example, a segment that begins at a minimum value of the autocorrelation, and extends for the length of a period, may be used as the initial estimate of the common pulse shape.

In yet another embodiment, the initial pulse estimate may be correlated with each of the epochs in an effort to verify that a robust estimate of the common pulse shape has been extracted (as compared to a spurious feature with a comparable amount of energy) prior to the estimation of the distinct phase rotations. In an example, normalized correlation values between 0.85 and 1.0 are expected if a "correct" epoch has been extracted as the initial pulse estimate.

In this embodiment, the phase estimation module 855 is realized using a bank of correlators that correlate each of the epochs with the initial pulse estimate. As described in reference to FIG. 8A, the final pulse estimation module 875 averages all K+1 de-rotated epochs to generate the final pulse estimate. Finally, the interference estimation module 895 generates an estimate of the interference by concatenating replicas of the final pulse estimate after they have been rotated by the respective estimate of the distinct phase rotation.

Figure 9:
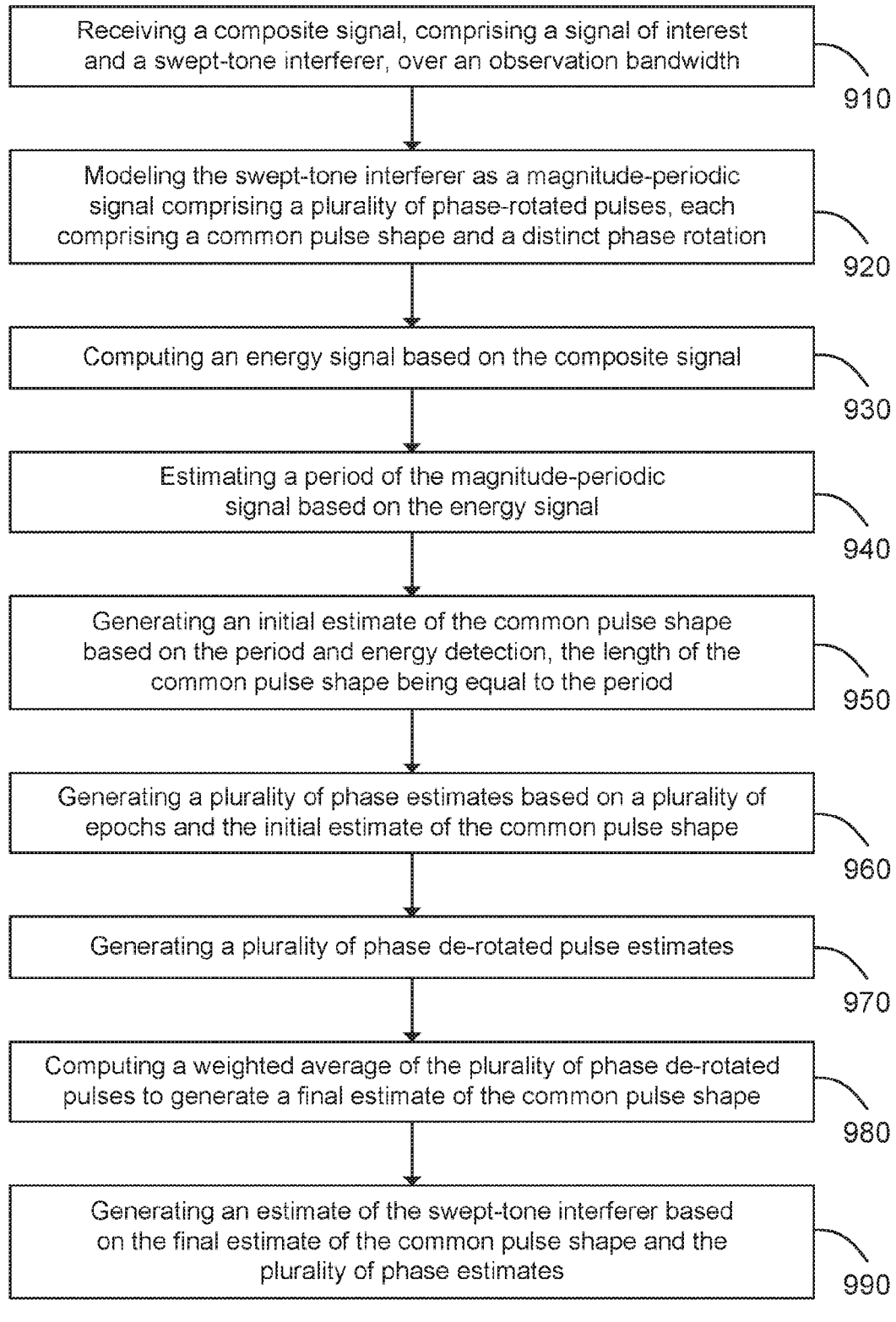
FIG. 9 is a flow chart for a method for estimation and mitigation of a swept-tone interferer, according to an embodiment of the present invention.

FIG. 9 is a flowchart for a method for estimating a swept-tone interferer, according to an embodiment of the present invention. In some embodiments, the order of steps in the flowchart may be changed. Furthermore, some of the steps in the flowchart may be skipped or additional steps may be added.

With reference to FIGS. 6, 8A and 8B, the method 900 begins at step 910 where a composite signal comprising the signal of interest and a swept-tone interferer is received. In an embodiment, the composite signal further comprises additive white Gaussian noise (AWGN). In another embodiment, the composite signal may further comprise other modeled interference. The composite signal is received (and sampled) over an observation bandwidth, and subsequently filtered using a low-pass filter. The low-pass filter may have a bandwidth that is less than or equal to the observation bandwidth, and in other embodiments, multiple low-pass filters may be employed for this purpose.

At step 920, the swept-tone interferer over the observation bandwidth is modeled as a magnitude-periodic signal comprising a set of non-overlapping, contiguous phase-rotated pulses. In an embodiment, each of the phase-rotated pulses comprises a common pulse shape and a distinct phase rotation. In another embodiment, the phase-rotated pulses further comprise distinct amplitudes.

At step 930, an energy signal is computed based on the composite signal using a magnitude-squaring function. The energy signal is a periodic signal, and may be segmented into epochs, each of which comprises at least the common pulse shape.

At step 940, the period of the magnitude-periodic signal is estimated based on at least one harmonic of a frequency spectrum of the energy signal. In an embodiment, the fast Fourier transform (FFT) is used to compute the frequency spectrum, and the period is based on only the strongest (and typically fundamental) harmonic of the frequency spectrum. In another embodiment, multiple harmonics (at frequencies 1/T, 2/T, 3/T, . . . ) are used to estimate the period, via an average or a weighted average.

At step 950, an initial estimate of the common pulse shape is generated based on the period and the energy detection of the energy signal. In an embodiment, an energy detector is used to determine the start and end (in time) of the common pulse shape and knowledge of the period enables the generation of an initial estimate of the common pulse shape. For example, the first epoch may be used as an initial estimate of the common pulse shape.

At step 960, the set of distinct phase rotations is estimated based on a plurality of epochs and the initial estimate of the common pulse shape. As noted earlier, the epochs are non-overlapping, contiguous segments of the filtered composite signal, wherein each epoch comprises a common pulse shape and a distinct phase rotation (which is being estimated at this step). In an embodiment, the initial estimate of the common pulse shape is correlated with each of the plurality of epochs to generate the distinct phase rotation estimate.

At step 970, a plurality of phase de-rotated pulse estimates are generated by multiplying each of the epochs by a unit vector that has a phase that is equal to the negative of the estimated distinct phase rotation for that epoch. In another embodiment, when the magnitude-periodic signal is modeled with both a distinct phase and amplitude, the $k^{th}$ pulse estimate is given by $\hat{A}_k v_k(t) \exp(-j\hat{\phi}_k)$.

At step 980, a weighted average of the plurality of phase de-rotated pulse estimates is computed to generate a final estimate of the common pulse shape. As is expected, the final estimate of the common pulse shape of the swept-tone interferer will be minimally affected by AWGN and the signal of interest due to the averaging of all the epochs.

At step 990, the final estimate of the common pulse shape is rotated by each of the distinct phase rotations, and the rotated final estimates are concatenated to generate an estimate of the swept-tone interference. In an embodiment, the estimate of the swept-tone interference is subtracted from the filtered composite signal to generate an interference-mitigated signal of interest.

Figure 10:
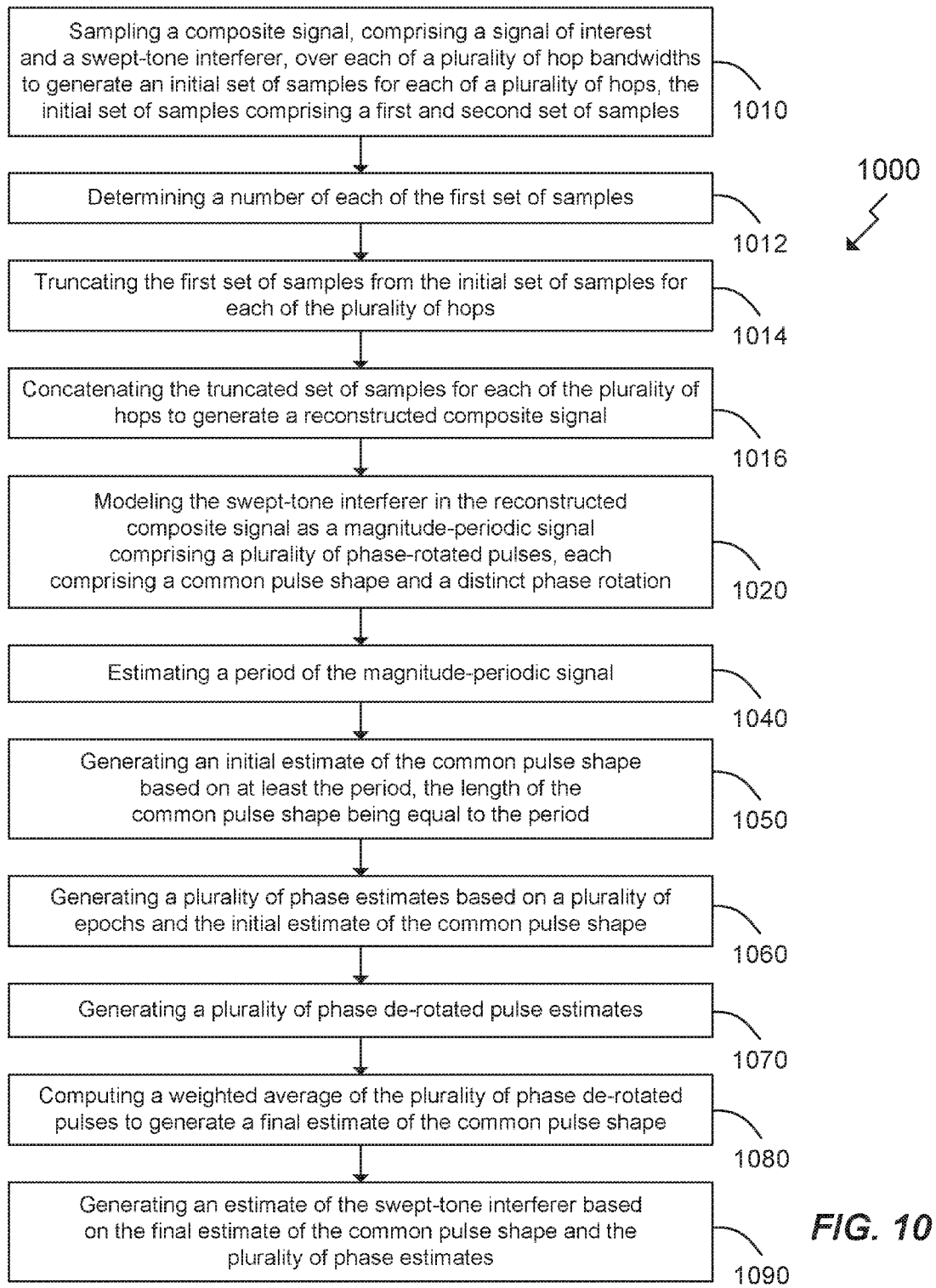
FIG. 10 is a flowchart for a method for estimation of a swept-tone interferer in a frequency-hopped system, according to another embodiment of the present invention.

FIG. 10 is a flowchart for a method for estimation of a swept-tone interferer in a frequency-hopped system, according to another embodiment of the present invention. In some embodiments, the order of steps in the flowchart may be changed. Furthermore, some of the steps in the flowchart may be skipped or additional steps may be added. This flowchart includes some steps that are similar to those shown in FIG. 9 and described above. At least some of these steps may not be separately described in this section.

With reference to FIGS. 7, 8A and 8B, the method 1000 begins at step 1010 where a composite signal, comprising the signal-of-interest and the swept-tone interferer, is sampled for each of the frequency hops of a frequency-hopped system. In an embodiment, and as shown in FIG. 2A, the interferer sweeps through the frequency band of each hop a certain number of times. However, the number of sweeps through any one frequency band is not enough to enable modeling the swept-tone interferer as a magnitude-periodic signal. In these embodiments, the samples from each of the frequency hops are combined to more reliably estimate the interferer.

In an embodiment, the composite signal is first processed through a bank of low-pass filters, where the passband of each of the low-pass filters corresponds to the frequency band for each of the frequency hops of the frequency-hopped system. That is, the center frequency of each of the low-pass filters in the filter bank corresponds to the center frequency of the frequency band for each of the frequency hops.

Sampling the composite signal, using an analog-to-digital converter, over the hop bandwidth for each of the frequency hops, generates a set of initial samples for each frequency hop. As discussed above in the context of FIG. 3, each initial set of samples comprises a first set of samples, in which the interferer has not yet entered the frequency band of that frequency hop, and a second set of samples, which are affected by the swept-tone interferer.

At step 1012, and as discussed above, the number of samples in the first set of samples for each initial set of samples is determined. This determination may be based on parameters of the swept-tone interferer, if they are known, or by energy detection on the initial samples of the first hop followed by cross-correlating the initial samples of the first hop with the initial samples of every other frequency hop. That is, the delay for each frequency hop is determined.

At step 1014, after having determined the number of the first set of samples for each initial set of samples, the first set of samples is truncated. At step 1016, the second set of samples for each frequency hop is concatenated, in the order of the frequency-hopping sequence, to generate a reconstructed composite signal.

The reconstructed composite signal, having been combined over all frequency hops, now contains a far greater number of sweeps of the interferer, and enables modeling the interferer as a magnitude-period signal, which is performed at step 1020. The modeling is similar to that described in step 920 in FIG. 9.

At step 1040, the period of the magnitude-periodic signal is estimated. In the case where the parameters of the swept-tone interferer are known, the period may be estimated as the inverse of the repetition rate. If the parameters are unknown, the method according to steps 930 and 940 in FIG. 9 may be employed to estimate the period. Steps 1040-1090 are similar to steps 940-990 in FIG. 9.

Figure 11:
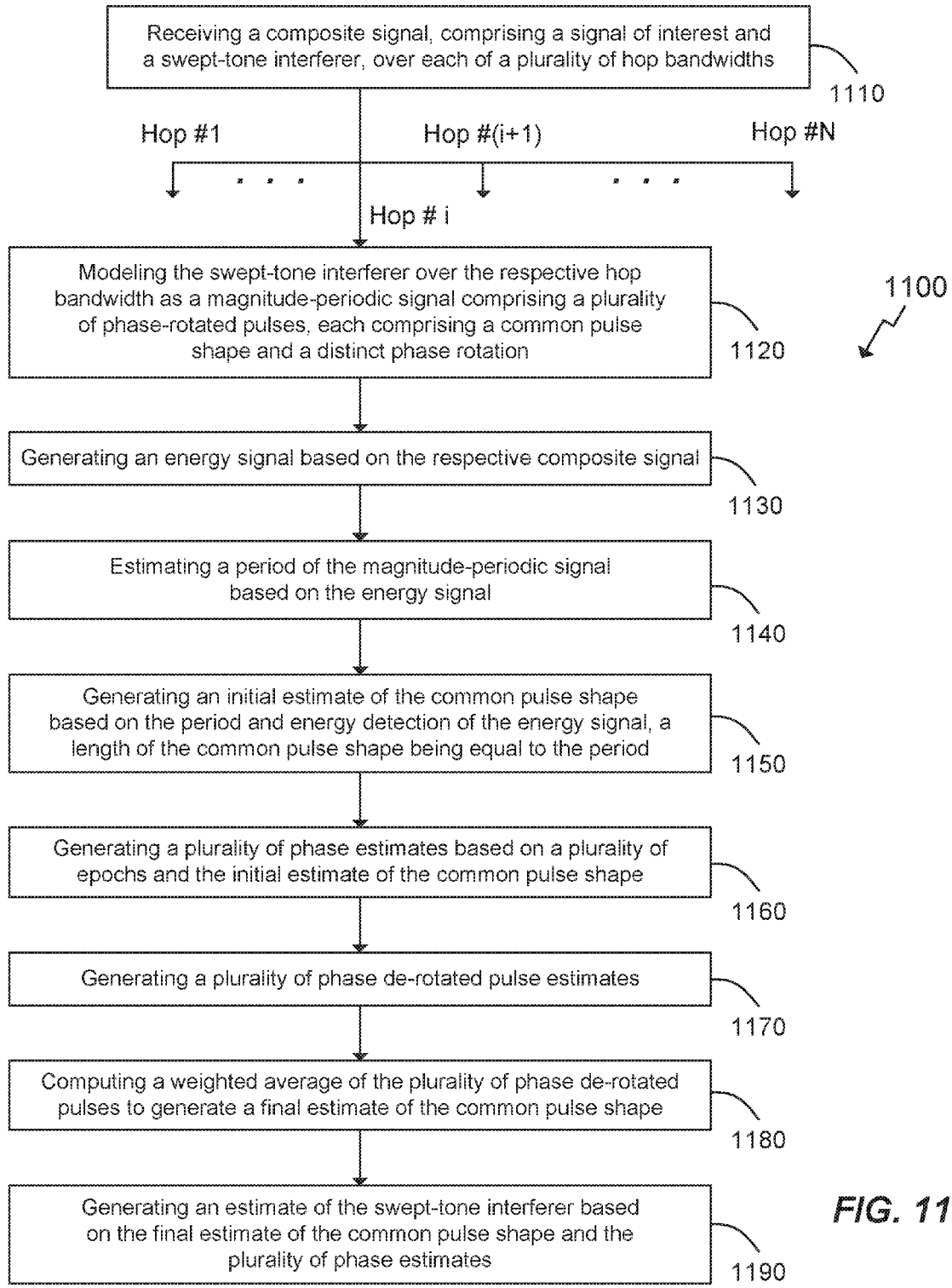
FIG. 11 is a flowchart for a method for estimation of a swept-tone interferer in a frequency-hopped system, according to yet another embodiment of the present invention.

FIG. 11 is a flowchart for a method for estimation of a swept-tone interferer in a frequency-hopped system, according to yet another embodiment of the present invention. In some embodiments, the order of steps in the flowchart may be changed. Furthermore, some of the steps in the flowchart may be skipped or additional steps may be added. This flowchart includes some steps that are similar to those shown in FIGS. 9 and 10 and described above. At least some of these steps may not be separately described in this section.

With reference to FIGS. 7, 8A and 8B, the method 1100 begins at step 1110 where a composite signal, comprising the signal-of-interest and the swept-tone interferer, is sampled for each of the frequency hops of a frequency-hopped system. In an embodiment, and as shown in FIG. 2B, the interferer sweeps through the frequency band of each hop a number of times that is greater than that described in FIG. 2A. That is, the number of sweeps through any one frequency band is enough to enable modeling the swept-tone interferer as a magnitude-periodic signal. In these embodiments, the samples from each of the frequency hops are processed independently and on a per frequency hop basis.

As shown in flowchart 1100, steps 1120 through 1190 are performed for each of the N hops of a frequency-hopped system. They are functionally similar to steps 920 through 990 as shown in FIG. 9 and described above.

Figure 12:
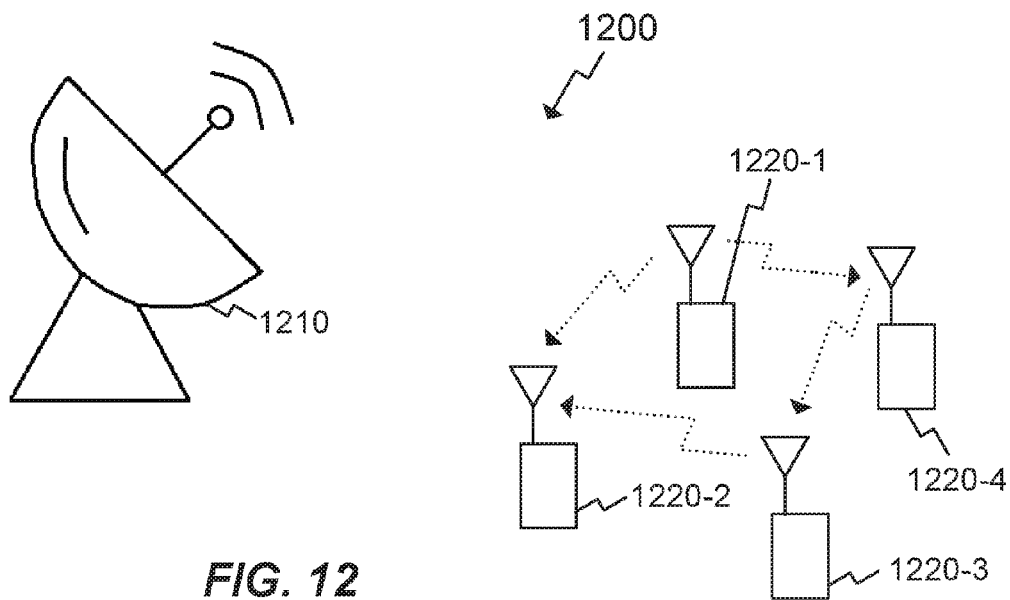
FIG. 12 is a block diagram of a system comprising the means for estimation and mitigation of a swept-tone interferer according to an embodiment of the present invention.

FIG. 12 depicts a system 1200 comprising means for estimation and mitigation of a swept-tone interferer according an embodiment of the present invention. This system includes some features and/or components that are similar to those shown in FIGS. 4 and 8 and described above. At least some of these features and/or components may not be separately described in this section.

In an embodiment, the system 1200 comprises member nodes 1220-1 . . . 1220-4 of a wireless network and a nearby radar installation 1210. The communication of the network nodes may be subject to interference due to the radar sweep signals, whose power is typically significantly higher than the power of the inter-node communications. In the observation bandwidth of the network nodes, the radar sweep signal acts as a swept-tone interferer that can be estimated and mitigation by embodiments of the present invention.

Figure 13:
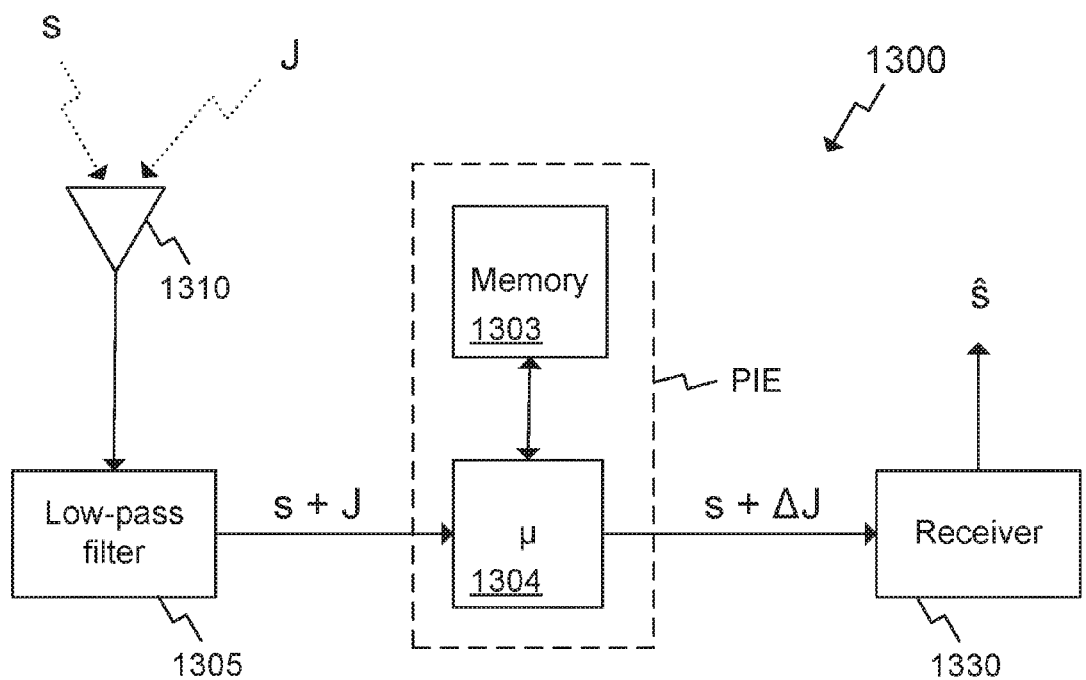
FIG. 13 is a block diagram of another system comprising the means for estimation and mitigation of a swept-tone interferer according to another embodiment of the present invention.

That is, each of the network nodes 1220-1 . . . 1220-4 may be configured as the system 1300 shown in FIG. 13, wherein an antenna 1310 receives both the signal of interests and the interfering radar sweep signal J. The low-pass filtered composite signal (s+J) is initially processed by the periodic interference estimator (PIE), which estimates and mitigates the swept-tone interferer according to embodiments of the present invention. The interference-mitigated signal (s+ΔJ) is subsequently processed by a receiver 1330 to enable network communication. The estimation and mitigation of the radar sweep signal will typically employ the model described in Equation (8), in which the each epoch comprises a common pulse shape, a distinct amplitude and a distinct phase rotation.

In an embodiment, the PIE unit comprises a processor 1304 and a memory 1303. The processor 1304 may comprise component digital processors, and may be configured to execute computer-executable program instructions stored in memory 1303. For example, the component digital processors may execute one or more computer programs for enabling the estimation and mitigation of swept-tone interferers in accordance with embodiments of the present invention.

Processor 1304 may comprise a variety of implementations for truncating and concatenating samples, estimating a period of the magnitude-periodic signal, an initial and final pulse estimate of common pulse estimate, a set of distinct phase rotations, and computing a weighted average of pulse estimates to generate an estimate of the swept-tone interferer, as well as a microprocessor, a digital signal processor (DSP), an application-specific integrated circuit (ASIC), one or more field programmable gate arrays (FPGAs), state machines, or the like. Processor 1304 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or another similar device.

Memory 1303 may comprise a non-transitory computer-readable medium that stores instructions which, when executed by the processor 1304, cause the processor 1304 to perform various steps, such as those described herein. Examples of computer-readable media include, but are not limited to, electronic, optical, magnetic, or other storage or transmission devices capable of providing the processor 1304 with computer-readable instructions. Other examples of computer-readable media comprise, but are not limited to, a floppy disk, CD-ROM, magnetic disk, memory chip, ROM, RAM, ASIC, configured processor, any optical medium, any magnetic tape or other magnetic medium, or any other medium from which a computer processor can access data. In addition, various other devices may include a computer-readable medium such as a router, private or public network, or other transmission device. The processor 1304 and the processing described may be in one or more structures, and may be dispersed throughout one or more structures.

Embodiments in accordance with aspects of the present subject matter can be implemented in digital electronic circuitry, computer hardware, firmware, software, or in combinations of the preceding. In one embodiment, a computer may comprise a processor or processors. A processor comprises or has access to a computer-readable medium, such as a random access memory (RAM) coupled to the processor.

While the present subject matter has been described in detail with respect to specific embodiments thereof, it will be appreciated that those skilled in the art, upon attaining an understanding of the foregoing, may readily produce modifications to, variations of, and equivalents to such embodiments. Accordingly, it should be understood that the present disclosure has been presented for purposes of example rather than limitation, and does not preclude inclusion of such modifications to, variations of and/or additions to the present subject matter as would be readily apparent to one of ordinary skill in the art.

What is claimed is:

1. A method for estimating a swept-tone interferer in a frequency-hopping system, the frequency-hopping system comprising a plurality of hops, each of the plurality of hops comprising each of a plurality of hop bandwidths, the method comprising:

sampling a composite signal over each of the plurality of hop bandwidths to generate an initial set of samples for each of the plurality of hops, wherein the composite signal comprises a signal of interest and the swept-tone interferer, and wherein each of the initial set of samples comprises a first set of samples and a second set of samples;

determining a number of the first set of samples for each of the plurality of hops;

truncating the first set of samples from the initial set of samples for each of the plurality of hops;

concatenating the truncated set of samples for each of the plurality of hops to generate a reconstructed composite signal;

modeling the swept-tone interferer in the reconstructed composite signal as a magnitude-periodic signal, wherein the magnitude-periodic signal comprises a plurality of phase-rotated pulses, and wherein each of the plurality of phase-rotated pulses comprises a common pulse shape and a distinct phase rotation;

estimating a period of the magnitude-period signal;

generating an initial estimate of the common pulse shape based on at least the period, wherein a length of the initial estimate of the common pulse shape is equal to the period;

generating a plurality of phase estimates based on a plurality of epochs and the initial estimate of the common pulse shape, wherein the plurality of epochs corresponds to non-overlapping, contiguous segments of the reconstructed composite signal, wherein a length of each of the plurality of epochs is equal to the period, wherein each of the plurality of epochs comprises the common pulse shape, and wherein each of the plurality of phase estimates is generated for each of the plurality of epochs;

generating a plurality of phase de-rotated pulse estimates, wherein each of the plurality of phase de-rotated pulse estimates is based on each of the plurality of epochs and each of the plurality of phase estimates;

computing a weighted average of the plurality of phase de-rotated pulse estimates to generate a final estimate of the common pulse shape; and generating an estimate of the swept-tone interferer based on the final estimate of the common pulse shape and the plurality of phase estimates.

2. The method of claim 1, further comprising:

generating a first energy signal based on the initial set of samples for a first of the plurality of hops;

determining the number of the first set of samples for the first of the plurality of hops based on energy detection of the first energy signal; and correlating the initial set of samples for the first of the plurality of hops with the initial set of samples for each other of the plurality of hops to determine the number of the first set of samples for the each other of the plurality of hops.

3. The method of claim 2, further comprising:

generating a second energy signal based on the reconstructed composite signal;

generating a frequency spectrum of the second energy signal; and estimating the period based on at least one harmonic of the frequency spectrum.

4. The method of claim 3, wherein the frequency spectrum of the second energy signal is based on a Fast Fourier Transform (FFT), and wherein the FFT is computed over a portion of the second energy signal that comprises at least one of the plurality of epochs.

5. The method of claim 1, wherein the number of the first set of samples for each of the plurality of hops is determined based on at least a repetition rate of the swept-tone interferer, and wherein the period of the magnitude-period signal is estimated based on an inverse of the repetition rate of the swept-tone interferer.

6. The method of claim 5, wherein determining the number of the first set of samples for each of the plurality of hops is further based on a sweep rate, a start frequency and a stop frequency of the swept-tone interferer.

7. The method of claim 1, wherein a weighting for each of the plurality of phase de-rotated pulse estimates in the weighted average is unity.

8. The method of claim 1, wherein each of the plurality of phase-rotated pulses further comprises a distinct amplitude, and wherein a weighting for each of the plurality of phase de-rotated pulse estimates in the weighted average is based on an estimate of the distinct amplitude.

9. The method of claim 1, wherein generating the estimate of the swept-tone interferer further comprises:

multiplying the final estimate of the common pulse shape and a unit vector with a phase that is equal to each of the plurality of phase estimates to generate a plurality of phase-rotated final estimates of the common pulse shape; and concatenating the plurality of phase-rotated final estimates of the common pulse shape.

10. The method of claim 1, wherein generating the initial estimate of the common pulse shape further comprises:

correlating the initial estimate of the common pulse shape with the plurality of epochs to generate a plurality of normalized correlation values, wherein each of the plurality of normalized correlation values is in the range 0.85 to 1.0.

11. An apparatus for estimating a swept-tone interferer in a frequency-hopping system, the frequency-hopping system comprising a plurality of hops, each of the plurality of hops comprising each of a plurality of hop bandwidths, the apparatus comprising:

an analog-to-digital converter configured to sample a composite signal over each of the plurality of hop bandwidths to generate an initial set of samples for each of the plurality of hops, wherein the composite signal comprises a signal of interest and the swept-tone interferer, and wherein each of the initial set of samples comprises a first set of samples and a second set of samples;

a delay estimation module configured to determine a number of the first set of samples for each of the plurality of hops;

a signal conditioning module configured to truncate the first set of samples from the initial set of samples for each of the plurality of hops, and concatenate the truncated set of samples for each of the plurality of hops to generate a reconstructed composite signal, wherein the swept-tone interferer in the reconstructed composite signal is modeled as a magnitude-periodic signal, wherein the magnitude-periodic signal comprises a plurality of phase-rotated pulses, and wherein each of the plurality of phase-rotated pulses comprises a common pulse shape and a distinct phase rotation;

a period estimation module configured to estimate a period of the magnitude-periodic signal;

an initial pulse estimation module configured to generate an initial estimate of the common pulse shape based on at least the period, wherein a length of the initial estimate of the common pulse shape is equal to the period;

a pulse and phase estimation module configured to:

generate a plurality of phase estimates based on a plurality of epochs and the initial estimate of the common pulse shape, wherein the plurality of epochs corresponds to non-overlapping, contiguous segments of the reconstructed composite signal, wherein a length of each of the plurality of epochs is equal to the period, wherein each of the plurality of epochs comprises the common pulse shape, and wherein each of the plurality of phase estimates is generated for each of the plurality of epochs, generate a plurality of phase de-rotated pulse estimates, wherein each of the plurality of phase de-rotated pulse estimates is based on each of the plurality of epochs and each of the plurality of phase estimates, and compute a weighted average of the plurality of phase de-rotated pulse estimates to generate a final estimate of the common pulse shape; and an interference estimation module configured to generate an estimate of the swept-tone interferer based on the final estimate of the common pulse shape and the plurality of phase estimates.

12. The apparatus of claim 11, further comprising:
a bank of low-pass filters configured to filter the composite signal, wherein a center frequency of each of the bank of low-pass filters corresponds to a center frequency of a frequency band for each of the plurality of hops.

13. The apparatus of claim 11, wherein the swept-tone interferer sweeps from a start frequency, $f_{start}$, to a stop frequency, $f_{stop}$.

14. The apparatus of claim 11, wherein a power of the swept-tone interferer is greater than a power of the signal of interest.

15. The apparatus of claim 11, wherein each of the plurality of phase de-rotated pulse estimates is a product of each of the plurality of epochs and a unit vector with a phase that is equal to a negative of each of the plurality of phase estimates.

16. The apparatus of claim 11, wherein the interference estimation module is further configured to:
multiply the final estimate of the common pulse shape and a unit vector with a phase that is equal to each of the plurality of phase estimates to generate a plurality of phase-rotated final estimates of the common pulse shape; and
concatenate the plurality of phase-rotated final estimates of the common pulse shape to generate the estimate of the swept-tone interferer.

17. A method for estimating a swept-tone interferer in a frequency-hopping system, the frequency-hopping system comprising a plurality of hops, each of the plurality of hops comprising a respective hop bandwidth, the method comprising:
receiving a composite signal over each of the respective hop bandwidths, wherein the composite signal comprises a signal of interest and the swept-tone interferer; and
for each of the plurality of frequency hops:
modeling the swept-tone interferer over the respective hop bandwidth as a magnitude-periodic signal, wherein the magnitude-periodic signal comprises a plurality of phase-rotated pulses, and wherein each of the plurality of phase-rotated pulses comprises a common pulse shape and a distinct phase rotation;
generating an energy signal based on the respective composite signal;
estimating a period of the magnitude-periodic signal based on the energy signal;
generating an initial estimate of the common pulse shape based on the period and energy detection of the energy signal, wherein a length of the initial estimate of the common pulse shape is equal to the period;
generating a plurality of phase estimates based on a plurality of epochs and the initial estimate of the common pulse shape, wherein the plurality of epochs corresponds to non-overlapping, contiguous segments of the composite signal, wherein a length of each of the plurality of epochs is equal to the period, wherein each of the plurality of epochs comprises the common pulse shape, and wherein each of the plurality of phase estimates is generated for each of the plurality of epochs;
generating a plurality of phase de-rotated pulse estimates, wherein each of the plurality of phase de-rotated pulse estimates is based on each of the plurality of epochs and each of the plurality of phase estimates;
computing a weighted average of the plurality of phase de-rotated pulse estimates to generate a final estimate of the common pulse shape; and
generating an estimate of the swept-tone interferer over the respective hop bandwidth based on the final estimate of the common pulse shape and the plurality of phase estimates.

18. The method of claim 17, wherein a weighting for each of the plurality of phase de-rotated pulse estimates in the weighted average is unity.

19. The method of claim 17, wherein each of the plurality of phase-rotated pulses further comprises a distinct amplitude, and wherein a weighting for each of the plurality of phase de-rotated pulse estimates in the weighted average is based on an estimate of the distinct amplitude.

20. The method of claim 17, wherein a power of the swept-tone interferer is greater than a power of the signal of interest in the respective hop bandwidth for each of the plurality of hops.

* * * * *